No. 835,216. PATENTED NOV. 6, 1906.
T. T. CROZIER.
OIL AND WATER SEPARATOR.
APPLICATION FILED JULY 12, 1906.
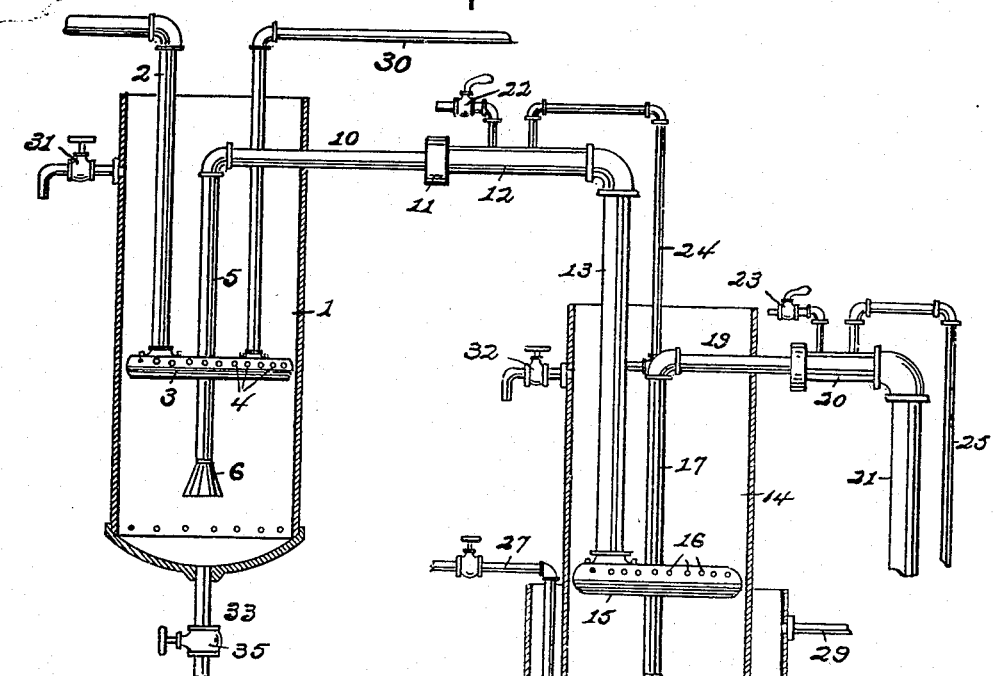
FIG. 1.
FIG. 2.
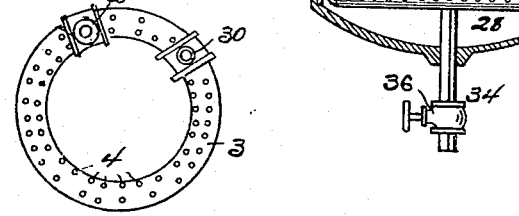
FIG. 3.
Witnesses:
Robt. F. Dilworth
Lee Walker.
Inventor
Thomas T. Crozier.
By H. E. Dunlap,
Attorney

UNITED STATES PATENT OFFICE.

THOMAS T. CROZIER, OF BELLAIRE, OHIO.

OIL AND WATER SEPARATOR.

No. 835,216.   Specification of Letters Patent.   Patented Nov. 6, 1906.

Application filed July 12, 1906. Serial No. 325,919.

*To all whom it may concern:*

Be it known that I, THOMAS T. CROZIER, a citizen of the United States of America, and a resident of Bellaire, county of Belmont, and State of Ohio, have invented certain new and useful Improvements in Oil and Water Separators, of which the following is a specification.

My invention relates to new and useful improvements in separators or filters for condensed water, and more particularly to a device for or system of separating the oil and water or for extracting the oil from the water as it passes from a condenser to a reboiler; and it consists in the particular construction, arrangement, and combination of parts, which will hereinafter be fully described.

The object of the invention is to provide a simple and efficient system particularly adapted for use in ice-manufacturing plants for extracting from the condensed water as it passes from the condenser to the reboiler the oil which inherently remains therein after leaving the condenser and also for removing from the water in the reboiler much of the oil which boils to the top of the water therein.

A further object of the invention is not only to purify the water used in ice-making by freeing the oil therefrom, but also to recover the oil in usable condition.

In describing the invention in detail reference is herein had to the accompanying drawings, forming a part of this specification, in which—

Figure 1 is a vertical section of the invention. Fig. 2 is a top plan view of a perforated coil or ring, and Fig. 3 is a plan of the under side of a cone.

Referring to said drawings, in which like reference-numerals designate like parts throughout the several views, 1 indicates a tank to which the condensed water from the condenser is delivered by a pipe 2, which depends within said tank and which is coupled at its lower end to a hollow coil or ring 3. Perforations 4 are provided in the upper face of said ring, so that water entering through said pipe 2 is ejected in small jets to break up or partially disintegrate the same, and thus to facilitate the separation of oil globules therefrom. A pipe 5, having a funnel-like end or cone 6, is suspended within said tank with said cone near the bottom of said tank. In the under side of said cone is a bottom plate 7, suitably supported, preferably by straps 8, leaving openings 9 about the edge to admit of the entrance of water to the pipe 5. As the water rises in the tank 1 it of course rises to its level in said pipe 5, which at a point below the top of the tank connects with a horizontal pipe 10, which passes outward through the side of the tank, as shown. Said pipe 10 is connected at its opposite end by a coupling or union 11 with a horizontal pipe 12, which connects at its opposite end with a vertical pipe 13, leading into a second tank 14. Said pipe 14 is coupled at its lower end to a coil or ring 15, similar to the ring 3, as shown. Perforations 16 are provided in said ring 15, as in the coil or ring 3, hereinbefore mentioned.

To prevent the formation of a siphon, the pipes 12 and 13 which I employ are of a considerably larger size than the pipe 10. The water from the tank 1 then passes to the tank 14 only as fast as delivered to said tank 1. A pipe 17, having a cone 18 upon its lower end similar to the cone 6, hereinbefore described, is suspended within the tank 14 with said cone near the bottom of said tank. A horizontal pipe 19, passed through the side of said tank 14, connects with said pipe 17, and has connected to its opposite end a horizontal pipe 20, which is in turn connected to a vertical pipe 21, leading to the ordinary float-tank. Said pipes 20 and 21 are of a considerably larger size than the pipe 19, the object being to prevent the formation of a siphon, and thus to allow water to pass from said tank 14 only as fast as it is delivered thereto.

The cones 6 and 18 are employed for the purpose of preventing, to a considerable extent, the agitation, due to suction, of the water in the bottoms of the tanks as the water enters the pipes 5 and 17, respectively, the object being to keep the water in the bottoms of the tanks quiet and still, and thus prevent dirt and sediment from passing with the water through said pipes.

Experiments have shown that when the tank 14 is filled and there has been a cessation of the flow thereto from the tank 1 the flow is again started with difficulty on account of the air-pressure in the pipes 10, 12, and 13 resisting the same. To obviate this difficulty, I provide a relief-valve 22, preferably in the pipe 12, which when open relieves the said air-pressure and allows the water to flow. Once started, the valve 22 may again be closed, and the flow will continue undisturbed as long as water is delivered to said tank 1. For the same purpose I employ a similar relief-valve 23 in the pipe 20.

At substantially the level of the water in the tank 1 when flowing to the tank 14 I connect one end of a pipe 24 to the vertical pipe 13, and the opposite end of said pipe 24 I connect with the pipe 12, as shown, the object being to admit of a circulation of air from a forward point to a rearward point to relieve any resisting pressure of air in the pipes 12 and 13 against the flow of the water therethrough. A similar pipe 25 is in like manner and for like purpose connected with the pipes 21 and 20, respectively, leading to the float-tank.

About the lower end of the tank 14 is a water-jacket 26, which is adapted to contain cold water to chill the water in said tank, and thereby facilitate the separation therefrom of such oil as remains therein. Said water-jacket is filled through a pipe 27, leading to a perforated coil or ring 28 in the bottom thereof, and a pipe 29 is provided therein for the overflow.

Leading from the ordinary reboiler to the tank 1 is an overflow-pipe 30, which carries from said reboiler the overflow. Said overflow, of course, contains the bulk of the oil in the water of the reboiler, since the oil naturally rises to the top of the water. Being thus passed from the reboiler, the hardening or coagulation of the oil into a paraffin-like substance which is consequent to continued boiling therein, causing much trouble because requiring frequent cleanings of the interior of the reboiler, is prevented. This overflow-pipe 30 is coupled to the coil or ring 3 in the tank 1, thus admitting of the saving of the oil from the reboiler together with that extracted from the water from the condenser.

In operation the water from the condenser is passed to the tank 1, it being ejected from the perforated coil or ring 3 in jets, as hereinbefore mentioned. The greater part of the oil in the water rises and stands upon the water, and as the water rises in the tank the oil rises therewith. When the oil and water reach the level of the pipe 10, the water begins to flow therethrough to the tank 14 and continues to flow as long as water is delivered to the tank 1 from the condenser, the oil in said tank remaining upon the top of the water at substantially the level of said pipe 10. In like manner does the water flow from said tank 14 to the ordinary float-tank when the water in the former reaches the level of the pipe 19. Cocks or valves 31 and 32 are provided in the tanks 1 and 14, respectively, in suitable positions for draining off the oil as it collects upon the top of the water in said tanks.

As is obvious, the number of tanks employed for the separation of the oil and water may be increased, if desired, each tank in the series delivering to the next in the manner herein shown and described.

In the bottoms of the tanks 1 and 14 are drain-pipes 33 and 34, respectively, guarded by drain cocks or valves 35 and 36, by means of which sediment may be drained from the bottoms of said tanks when desired.

I have described my invention in what I consider to be its simplest form; but it is obvious that various slight alteration and changes may be made in the construction and arrangement of the parts composing the invention without departing from the general spirit or scope thereof. Hence I do not wish to limit myself to the precise construction and arrangement herein shown and described.

Having thus fully described my invention, what I claim as new, and desire to secure by Letters Patent, is—

1. In a device of the character described, a series of tanks adapted to be interposed between a condenser and a float-tank, a receiving-pipe leading to the first tank of the series, an overflow-pipe connecting each tank with the next succeeding tank of the series, means for preventing siphonic action, in said overflow-pipes, and means for effecting the discharge of water from one tank to another without agitation of the contents of the tanks.

2. In a device of the character described, a series of tanks adapted to be interposed between a condenser and a float-tank, a pipe for delivering water from the condenser to the first tank in the series, a perforated coil on the discharge end of said pipe, an overflow-pipe connecting each tank with the next in series, the receiving end of said overflow-pipe being located near the bottom of the tank, a cone on said receiving end for preventing agitation of the tank's contents, means for preventing siphonic action in the overflow-pipe, and perforated coils on the discharge ends of said overflow-pipes.

3. In a device of the character described, a series of separating-tanks, adapted to be interposed between an alembic and a receiving-tank, a receiving-pipe leading from the alembic to the first tank in the series, an overflow-pipe leading from each tank to the next succeeding tank of the series, means for preventing siphonic action in said overflow-pipe, and means for preventing agitation of the contents of each tank.

4. In a device of the character described, a series of separating-tanks adapted to be interposed between an alembic and a receiving-tank, a receiving-pipe leading from the alembic to the first tank in the series, overflow-pipes leading from each tank to the next succeeding tank of the series, means for preventing siphonic action in said overflow-pipes, means for relieving air-pressure in said overflow-pipes after a cessation of the flow therethrough, and means for preventing agitation of the contents of each tank.

Signed by me in the presence of two subscribing witnesses.

THOMAS T. CROZIER.

Witnesses:
FRANK S. MASON,
LUTELLIS DUNFEE.